INVENTORS
MEIR M. LEHMAN
JACK L. ROSENFELD
BY Isidore Match
ATTORNEY 3,440,619

CONTROL SYSTEM FOR MAINTAINING REGISTER CONTENTS DURING INTERRUPT AND BRANCH CONDITIONS IN A DIGITAL COMPUTER

Meir M. Lehman, Bronx, and Jack L. Rosenfeld, Tarrytown, N.Y., assignors to International Business Machines Corporation, Armonk, N.Y., a corporation of New York Filed July 14, 1967, Ser. No. 653,367
Int. Cl. G11b *13/00*
U.S. Cl. 340—172.5 7 Claims

ABSTRACT OF THE DISCLOSURE

A control system in a digital computer which effects the storing of the contents of only those registers that are being used in the execution of a program and that are required by an interrupting program. The control system causes the automatic restoring of the contents of only those registers whose contents have been modified and are later to be used again in the execution of the program. The programmer need not be aware of such control operation but can assume that all of the registers' contents are stored and restored automatically. Substantially none of the registers' contents are unnecessarily stored or restored. Because the control operation is performed by hardware controls, no instruction fetch time is required for the performance of such operation. The storing and restoring are performed dynamically as a particular register becomes involved in an instruction.

*Background of the invention*

This invention relates to control arrangements in digital computers. More particularly, it relates to improved control systems for effecting efficient use of computer registers during program interrupt situations.

In known interrupt arrangements in digital computers, the interrupts are generally handled in a relatively cumbersome manner. The usual practice in the handling of such interrupts has been to program a computer to branch to a subroutine for handling the processing required for an interrupt condition after the occurrence of the interrupt situation has caused the computer to trap to a location that is associated with such interrupt condition. With such arrangements, the first several instructions of the interrupt-processing subroutine effect the storing of the contents of those registers of the computer that may possibly be employed in the execution of the subroutine. In the most complete and, consequently, most inefficient arrangement, the contents of all of the registers of the computer are so caused to be stored. Thereafter, when the interrupt subroutine is completed, the contents of all of these registers are restored thereto before control is returned to the interrupted program. Where the subroutine effecting the interupt condition processing is itself interrupted, the same procedure is followed to achieve the processing of the higher lever level interrupt. It is readily appreciated that the latter procedure may occur to several levels of interrupt.

A similar procedure is followed in known computers for handling subroutines other than those of the interrupt type. Thus, when a transfer occurs from a main program to a subroutine, the initial instructions of the subroutine are for effecting the storage of the contents of all of the registers that the subroutine may even possibly make use of. Then, before control is returned to the main program, the contents of all of those registers that had been previously stored upon the initiation of the subroutine are restored thereto. If the subroutine itself calls for a second subroutine, the same procedure of the storing of the contents of and the restoring of the contents to the registers is followed in the second subroutine. Here again, such storing and restoring may have to be extended to several levels of subroutine branching.

The procedure as set forth hereinabove is wasteful and inefficient for many reasons. For example, it necessitates programmer concern with the storing of the contents of and restoring of the contents to all of the registers that might possibly be used. Furthermore, it requires the unnecessary storing and restoring of registers that have never been and might never be used by the interrupted program and in the unnecessary storing and restoring of registers that are never modified by the interrupting program. And, of course, there is the wastefulness caused by the expenditure of time in fetching the instructions for achieving the storing and restoring of register contents.

Accordingly, it is an important object of this invention to provide a control system in a digital computer for automatically storing the contents of only those registers which are being used in the execution of a program and which are required for the execution of an interrupting program.

It is another object to provide a control system in a digital computer for automatically restoring the contents of only those registers whose contents have been modified by an interrupting program and later are to be employed in the execution of a main program.

It is a further object to provide a control system in a digital computer for storing the contents of and restoring the contents to registers in a main-interrupt, main-program execution sequence in which no registers' contents are unnecessarily stored or restored.

It is still another object to provide a control system in a digital computer for storing the contents of and restoring the contents to registers in a main-interrupt, main-program sequence in which there is entailed no instruction fetch time expenditure.

*Summary of the invention*

In accordance with the invention, there is provided a control system for storing in memory the contents of those processor registers which are used in a program execution and in a plurality of interrupt levels. The system comprises respective progressively ranked areas in the memory which are reserved for each of the aforesaid interrupt levels and for the storing prior to their modification, of the contents of those processor registers which are modified during such levels, the operation of the processor in the program execution being considered the lowest rank of the levels. There are further included in the system first means whose contents identify those of the processor registers whose contents are modified during a given level of interruption and second means whose contents identify all of the processor registers whose contents had been modified up to the occurrence of the given level of interruption. Means are provided responsive to the occurrence of the given level of interruption for storing the contents of the first and second means in the memory area reserved for the level next lower than the given level, for combining logically the contents of the first and second means and transferring these data to the second means, and for resetting the first means whereby the first means is conditioned to thereafter identify tnose registers whose contents are modified during the given level interrupt. There are also included in the system means operative upon the attempted modification of the contents of a register during the given level interrupt for effecting the indication of the occurrence of such modification in the first means and for storing the contents of the last-named register in the area reserved for the given level interrupt. A third means are provided whose contents identify those of the processor registers whose contents had been modified during a given level interrupt upon the termination of such condition. There are further provided means responsive to the termination of the given level interrupt for transferring the contents of the first means to the third means and for replacing the respective contents of the first and second means with their contents which had been stored in the memory area for the level next lower than the given level upon the occurrence of the given level interrupt.

The foregoing and other objects, features and advantages of the invention will be apparent from the following more particular description of preferred embodiments of the invention, as illustrated in the accompanying drawings.

*Description of a preferred embodiment*

Figures 1, 1A:
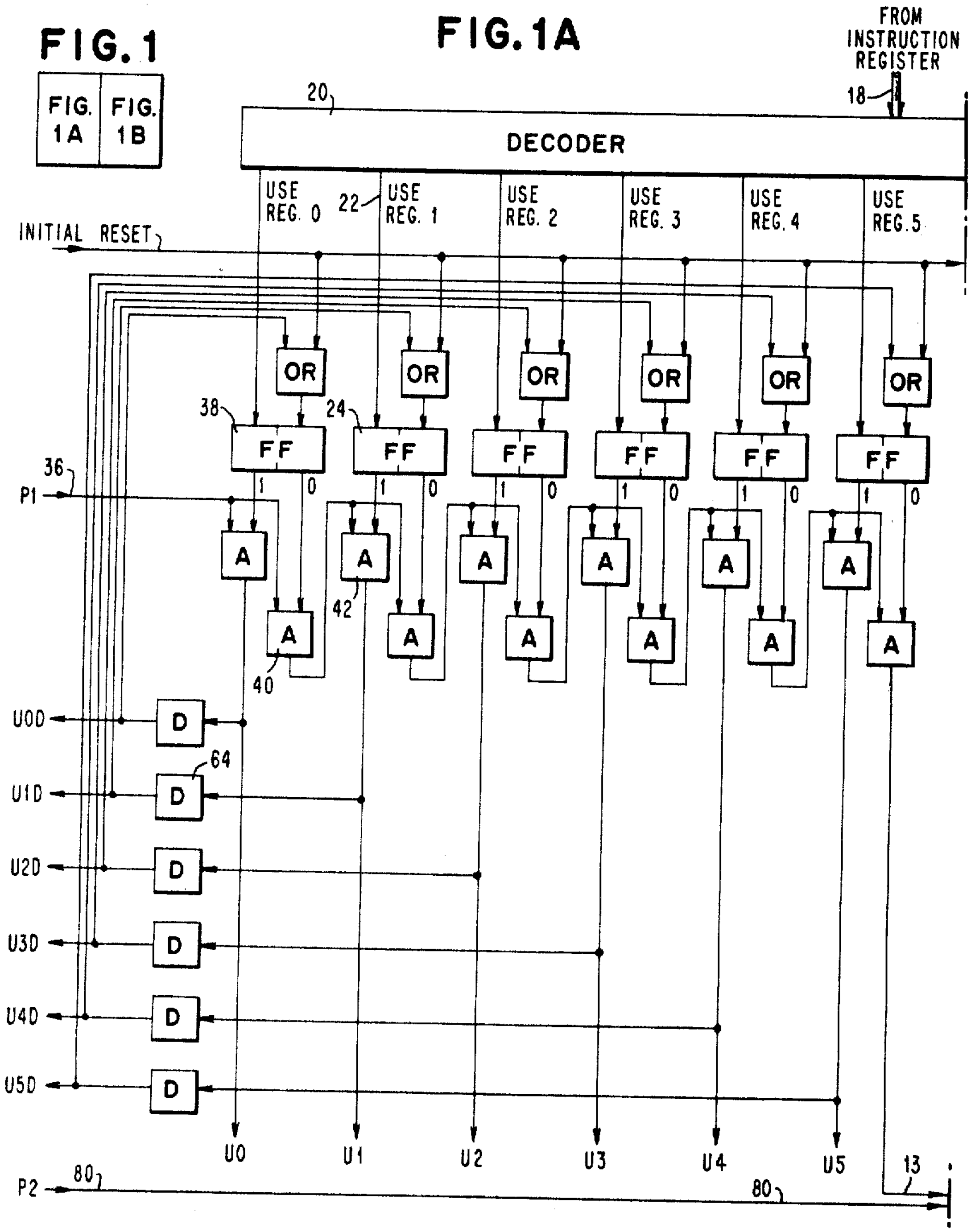
FIGS. 1A and 1B taken together as in FIG. 1 is a block diagram of an illustrative embodiment of an arrangement constructed in accordance with the principles of the invention for effecting a search for a processor register whose contents are to be used or modified.

Prior to describing the structure and operation of the invention in conjunction with the drawings, it is to be noted that for convenience of explanation, the embodiment depicted in the drawing is shown to be capable of eight interrupt levels, one of these levels being the zero or no interrupt level. However, it is of course realized that in actual practice the number of interrupt levels may be much more than eight with an appropriate increase in the hardware which is employed. Alternatively, rather than the effecting of an enlargement of the hardware, an overflow procedure may be employed. In the latter situation, in the event that it were desired to employ a number of levels of interrupt in excess of eight, the computer could revert to the usual software method of handling interrupts for those in excess of eight.

It is also to be noted that, for convenience of description and explanation of operation, the number of registers which are shown is six and a separate memory is indicated for storing the contents of the registers. In actual practice in a computer system, the separate register memory could actually be a part of the main computer memory and space could be allocated therein for the registers. In addition, there is shown a memory address register which may be the address register of the memory or it could be an additional register separate from the memory.

The implementation of the embodiment described in the drawings is effected with a given arrangement of logic. However, it is understood that other logic arrangements may be employed in carrying out the invention to adapt the invention to various types of digital computers. Accordingly, it is not intended to be limited to the specific schemes shown in the drawing.

According to the invention three given latches $U_i$, $T_i$ and $L_i$ are provided for a given register $R_i$. The set of all of the $U_i$ or $T_i$ or $L_i$ latches may for convenience of understanding be considered to form three registers U, T and L respectively. One area of memory may be respectively reserved for each level of interrupt, each of the latter areas conveniently being designated as "save" areas, there being a location reserved for the contents of each processor register and space for the contents of the T and L registers.

The control system may be understood by considering the initial status of the processor. Thus, when a new task is loaded into the processor, all of the U, T, and L latches are reset. Thereafter, whenever the contents of a given register $R_i$ are first modified, i.e., written into, latch $T_i$ is set. Thus, at any time the state of register T identifies those processor registers whose contents have previously been modified.

Now, when an interrupt arrives, the contents of register T are automatically stored in the "save" area of memory for the zero-earth level of interrupt. Register L is then loaded with the contents of register T and register T is reset. At this point, therefore, register L contains the record of all of the registers that have been used in the interrupted program. Thereafter, whenever an instruction first attempts to modify, i.e., write into a prescribed register for which its corresponding latch $L_i$ is set, the contents of such register are first stored in the "save" area in memory corresponding to the first level of interrupt. The latch $T_i$ corresponding to or associated with the latter prescribed register is then set and the program proceeds. Thereafter, if the contents of the aforesaid same prescribed register are further modified, the fact that its corresponding latch $T_i$ is already set signifies that the contents of the prescribed register have been previously stored and should not be stored again. A latch $T_i$ is always set the first time that the contents of its corresponding register $R_i$ are modified. With such arrangement, the contents of those computer registers that have been modified by the interrupted program are stored, and such storage is performed only if the contents of the latter registers are actually modified in the execution of the interrupting program.

Should a second or higher level of interruption occur while a first level or any other level of interrupt is in progress, it is also handled by the control system according to the invention. Thus, when such second level of interrupt occurs, the contents of the T and L registers are automatically stored in the appropriate slots in memory of the "save" area for the first level of interrupt. In addition, corresponding bits of the T and L registers are gated together such as through an OR arrangement to replace the previous contents of the L register. Register T is reset and, at this point, register L indicates which registers have been modified by the first interrupted program or the first level of interrupt.

The control system now operates as it had operated in the first level of interrupt, i.e., effecting the setting of the appropriate latch $T_i$ whenever the contents of its corresponding register $R_i$ are modified and storing the contents of the latter register $R_i$ whenever they are to be modified and the states of latches $T_i$ and $L_i$ indicate that they have been modified by a lower level of interrupt but haven't been stored as a result of a previous instruction at the present level of interrupt. The only difference in operation at this juncture is that the old contents of the registers are stored in the memory area corresponding to the second level of interrupt.

Succeeding levels of interrupt are similarly handled. Register L always indicates those registers whose contents have been modified by any lower level of interrupt. Register T indicates those registers whose contents have been modified by the current level of interrupt. Register contents are stored in the "save" area of memory for this current level of interrupt for those registers whose contents have been modified by this level of interrupt and by any lower level.

The remainder of the control action of the control system acording to the invention is concerned with the restoring of registers' contents as control is returned from the current interrupt level to the level that the current interrupt level had interrupted, i.e., the next lower level. The U register is employed in this remainder action.

To understand this latter action, let it be assumed that a processor has undergone N levels of interruption. Its L register contains an indication of all of the registers that have been modified during the original program and during all lower levels, i.e., $N-1$ levels, of interruption. Its T register contains an indication of all of the registers that have been modified during the current, i.e., the Nth level of interruption. Register U at this point is still completely in the reset state. When the processor has completed the processing of the Nth level of interruption, it executes a special instruction that returns control to the next lower level of instruction, the $(N-1)$th level, i.e., a program complete instruction. At this juncture, several actions take place automatically as follows: The contents of the T register replace the contents (previously all zero) of the U register. The current contents of the T and L registers are replaced with the contents of those registers that had previously been stored in the "save" area of memory for the $(N-1)$th level of interrupt.

At this time, register U indicates those registers whose contents have been stored in the "save" area for the Nth level of interrupt. Register T indicates those registers whose contents had been modified by the $(N-1)$th level of interrupt before the latter level had been interrupted by the Nth level. Register L indicates those registers whose contents had been modified by the $(N-2)$th through the (zero)th levels of interrupt. Now, whenever in the execution of an instruction, it is attempted to utilize the contents of a processor register, $R_i$, the status of the $U_i$ and $T_i$ latches have to be examined to determine whether the register contents have to be restored from the "save" area in memory for the Nth level of interrupt. Also, whenever an instruction requires that the contents of a register $R_i$ be modified, all of the three latches corresponding thereto, viz., latches $T_i$, $L_i$ and $U_i$ are tested to check as to whether any storing and/or restoring of contents are necessary before the instruction can be executed. The status of the latches have also to be changed. In the following table, there are indicated the changes that are generally to be made. The operations set forth in the table function to store or restore register contents from the aforementioned "save" areas of memory only when such memory access is necessary for the proper functioning of the processor.

TABLE.—MODIFICATIONS MADE UPON CONTROL LATCHES AND UPON REGISTER CONTENTS AT THE NTH LEVEL OF INTERRUPT

| Type of register access | Original status | | | Modified status | | | Operations |
|---|---|---|---|---|---|---|---|
| | $U_i$ | $T_i$ | $L_i$ | $U_i$ | $T_i$ | $L_i$ | |
| U | 0 | 0 | 0 | 0 | 0 | 0 | |
| M | 0 | 0 | 0 | 0 | 1 | 0 | |
| U | 0 | 0 | 1 | 0 | 0 | 1 | |
| M | 0 | 0 | 1 | 0 | 1 | 1 | S |
| U | 0 | 1 | 0 | 0 | 1 | 0 | |
| M | 0 | 1 | 0 | 0 | 1 | 0 | |
| U | 0 | 1 | 1 | 0 | 1 | 1 | |
| M | 0 | 1 | 1 | 0 | 1 | 1 | |
| U | 1 | 0 | 0 | 0 | 0 | 0 | |
| M | 1 | 0 | 0 | 0 | 1 | 0 | |
| U | 1 | 0 | 1 | 0 | 0 | 1 | R |
| M | 1 | 0 | 1 | 0 | 1 | 1 | R, then S |
| U | 1 | 1 | 0 | 0 | 1 | 0 | R |
| M | 1 | 1 | 0 | 0 | 1 | 0 | |
| U | 1 | 1 | 1 | 0 | 1 | 1 | R |
| M | 1 | 1 | 1 | 0 | 1 | 1 | |

In the foregoing table, the letter U signifies that the contents of a register are to be used.

The letter M signifies that the contents of the register are to be modified. If in a given instruction, the contents of the same register are both used and modified, the operations required for the U condition are carried out before those for the M condition.

The letter R signifies that the contents of the register from the $(N+1)$th area in memory replace the present contents of such register before processing proceeds.

The letter S signifies that the contents of the register are stored in the Nth save area before processing proceeds.

In the most general case, when control is returned from the Nth interrupt level to the $(N-1)$th level, several actions take place. Any registers $R_i$ for which the joint binary status of latches $U_i$ $T_i$ $L_i$ is 101 have their contents restored automatically from the "save" area of memory for the $(N+1)$th level of interrupt. Next, the contents of the T register replace the contents of the U register and the contents of the T and L registers are replaced by those values previously stored in the "save" area for the $(N-1)$th level of interrupt. Thereafter, register contents "saving" is effected in the "save" area for the $(N-1)$th level of interrupt. It is realized that the automatic restoring of the contents of register $R_i$ from the "save" area of memory for the $(N+1)$th level of interrupt is the only possibly unnecessary storing or restoring that is done in the system according to the invention and is performed to prevent a certain error condition from occurring.

The control for the general case of an interruption at the Nth level of interrupt to move to the $(N+1)$th level requires that the contents of the T and L registers be stored in the Nth level "save" area; that the contents of the L register be replaced by the bit-by-bit output of a logical OR arrangement of the contents of the T and L registers; that the contents of the T register be replaced by the contents of the U register; and that the U register be completely reset. Thereafter, the contents of registers are "saved" in the "save" area for the $(N+1)$th level of interrupt.

The operation as described hereinabove pertains to the use of the control system for facilitating entry into and return from subroutines, with the possible only difference being that a special instruction has to be included to effect entry into the subroutine and thereby indicate to the control system that a new level of subroutine is being entered. In addition there has to be employed an instruction to return from the subroutine, such as the type of instruction described for returning control to a lower level of interrupt.

In a simpler embodiment of the invention, processing may, for example, be permitted for only one level of interrupt. In such embodiment, no U register is necessary and only one "save" area in memory is required. In such embodiment, initially, when the main program is started, both the T and L registers would be reset. Whenever a register $R_i$'s contents are modified, its corresponding latch $L_i$ is set. When an interrupt arrives, each modification of a register for which its corresponding latches, $T_i$, $L_i$ have a 0, 1 setting causes the contents of such register to be saved prior to their modifications and latch $T_i$ is set. Of course, when a first interrupt arrives, no second interrupt would be permitted until the processing of the first interrupt is completed and control has been returned to the main program.

When control is returned to the main program, the contents of the register $R_i$ are restored from the single "save" area whenever it is attempted to use the contents of a register for which its corresponding latches $T_i$ and $L_i$ have respective states of 1, 1 in the execution of an instruction, with latch $T_i$ always being reset whenever the register $R_i$ is used or modified.

A second interrupt that arrives after the first has returned control to the main program results in the same sequence of operations as in the case of the first interrupt.

The state in which the second interrupt finds the T and L latches is not changed until the modification of the contents of a register causes the changes as described above.

An additional feature of the invention, i.e., is one which enables the handling of a "Reset T Latch" instruction. This feature is effective to enable a programmer to explicitly specify to the control system that he is no longer interested in the contents of certain processor registers and thereby desires that their respective corresponding $T_i$ latches be reset. Such instruction enables the saving of unnecessary register storage in the case where an interrupt or a subroutine call occurs. The instruction Reset T Latch addresses a word in regular memory that contains a mask word (M) previously stored by the program. For every register $R_i$, latch $T_i$ may be reset if bit $M_i$ is 0. A further condition, to prevent erroneous operation, is that latch $L_i$ be in the zero state. Thus, the new value of $T_i$ is $T_i(L_i+M_i)$.

It may also be desirable to automatically reset $T_i$ (but only if $L_i$ is in the zero state) after an indexing with branch type instruction when the contents of register $R_i$ are indexed to a value such that the branch is not taken.

Referring now to FIG. 1 wherein there is depicted in block diagram form an arrangement for achieving a search for a register or registers which are to be used or modified in response to the branching from the execution of a program to that of an interrupt program or a subroutine, an instruction decoder 20 is provided therein to which there extend lines 18, lines 18 coming from the computer instruction register. In decoder 20, there is analyzed each instruction at the time that an instruction is loaded into the instruction register, decoder 20 providing output pulses on appropriate output lines. Lines 18 are energized at an appropriate juncture in the computer cycle. Any flip-flops or registers that require initial resetting are reset with the commencement of computer operation.

Thus, for example, if a given instruction calls for the use of the contents of a register such as register 1, a pulse of appropriately relatively short duration appears on its line 22 to set a flip-flop 24 to its "one" state. Concurrently, a relatively short pulse appears on an output line 26 from decoder 20 which will be passed through an OR gate 28 to activate a line 11. When line 11 is so activated it functions to energize the first stage of a "process clock," P1, which may suitably be a monostable multivibrator as is further explained hereinbelow. The process clock is energized each time that the contents of respective registers are to be used or modified and controls a prescribed sequence of events.

A necessary condition for proper operation of the control system is that there be provided sufficient time between the recognition of an instruction in decoder 20 and its subsequent execution which is to take place. Thus, if, in the processor to which the control system according to the invention is adapted, there is not provided such sufficient time, then there can be readily employed some form of a so-called "instruction look-ahead" arrangement, in order to overlap a process clock with the execution of a prior instruction. The latter type arrangement does not form part of this invention and is sufficiently well known in the art such that further description thereof is deemed unnecessary.

Figure 3:
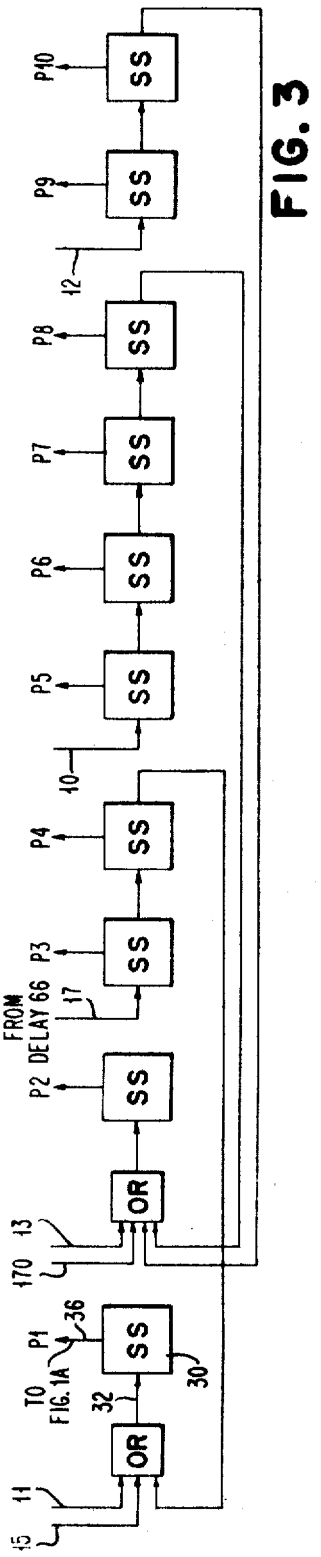
FIG. 3 is a block diagram of an embodiment suitable for use as the program clock in the invention.

Referring now to FIG. 3, wherein there is shown an embodiment of a process clock suitable for use in the system according to the invention, the stages therein designated P1 and P2 respectively, and legended SS (single shot) may suitably be monostable multivibrators. In the operation of this clock, for example, stage 30, i.e., multivibrator P1, is "turned on" (switched to its astable state) when a triggering pulse therefor appears on line 32. In the "on" state of stage 30, line 34 is consequently "active," i.e., a pulse appears thereon. The duration in which line 34 remains active is adjustably chosen in accordance with the function to be performed by the pulse thereon. When a monostable multivibrator goes "off," i.e., reverts to its stable state, it produces an output pulse which can be utilized to "turn on" a succeeding monostable multivibrator.

Figures 2, 2A:
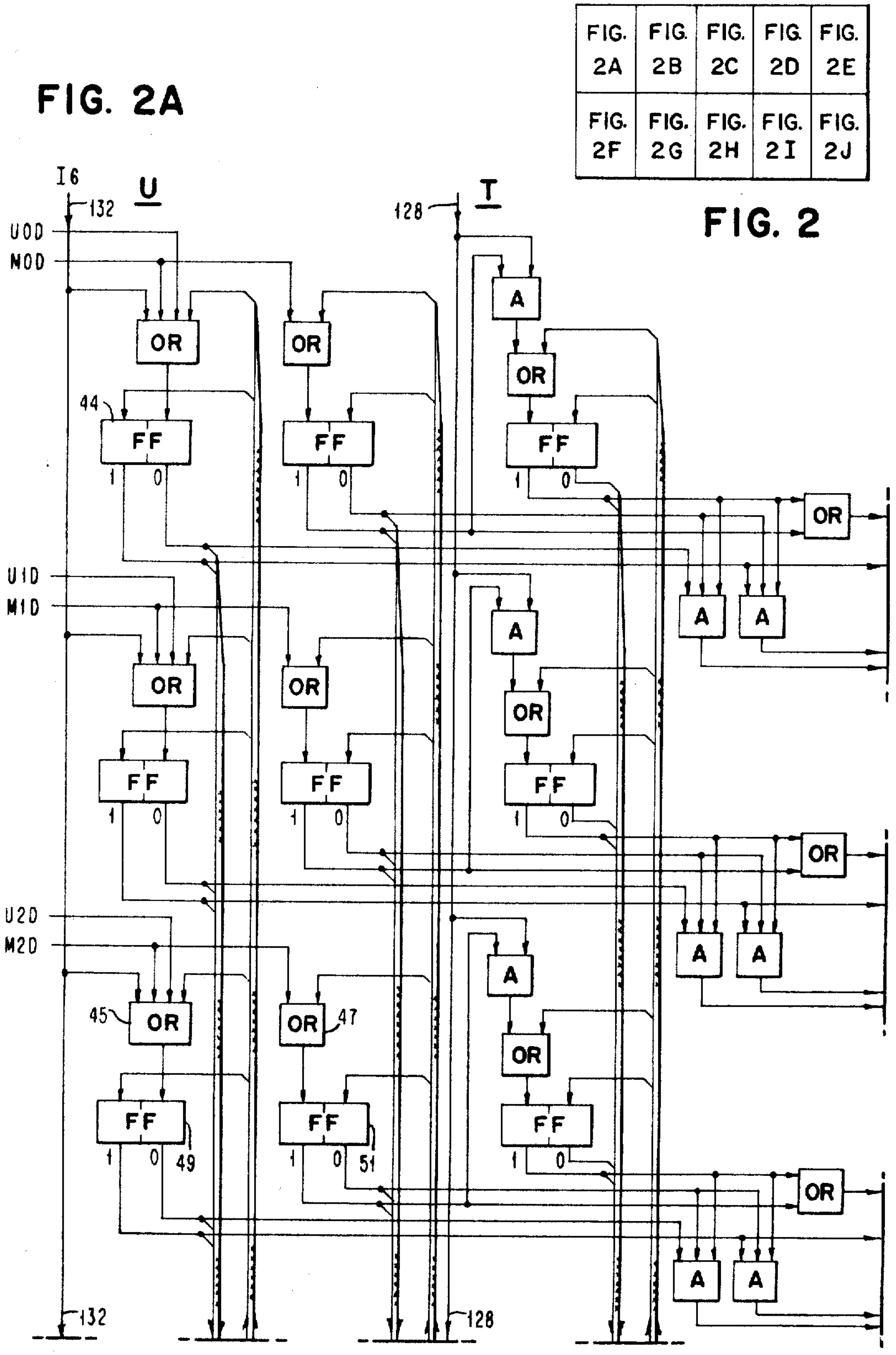
FIGS. 2A–2J taken together as in FIG. 2 is a block diagram of an embodiment of a system according to the invention for automatically effecting the storing or restoring of the contents only of those processor registers that must be stored or restored, as discussed hereinabove, and the storing and restoring of the contents of the first and second means and the transferring of contents among the first, second, and third means.
Figure 2B:
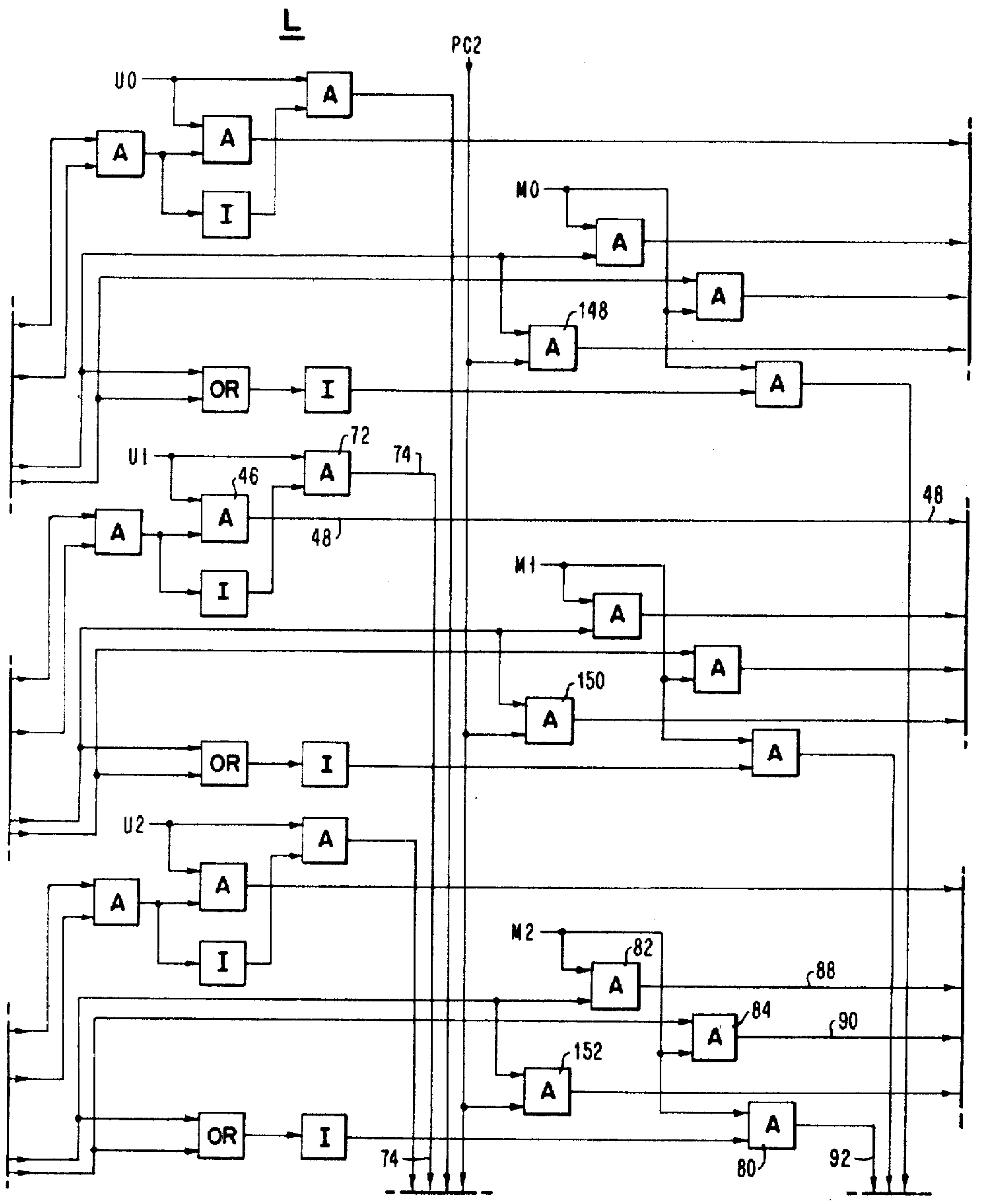
Figure 2C:
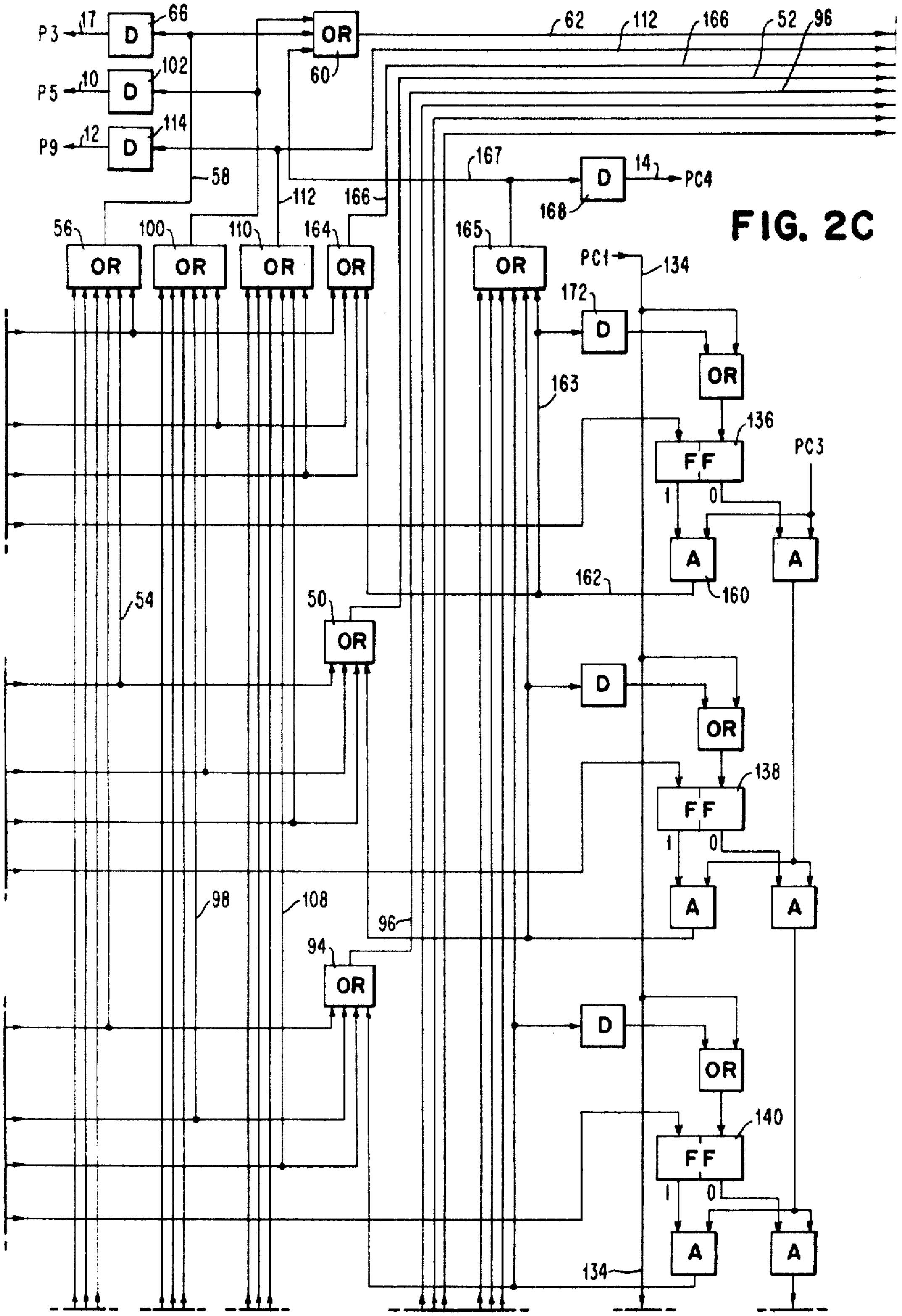
Figure 2D:
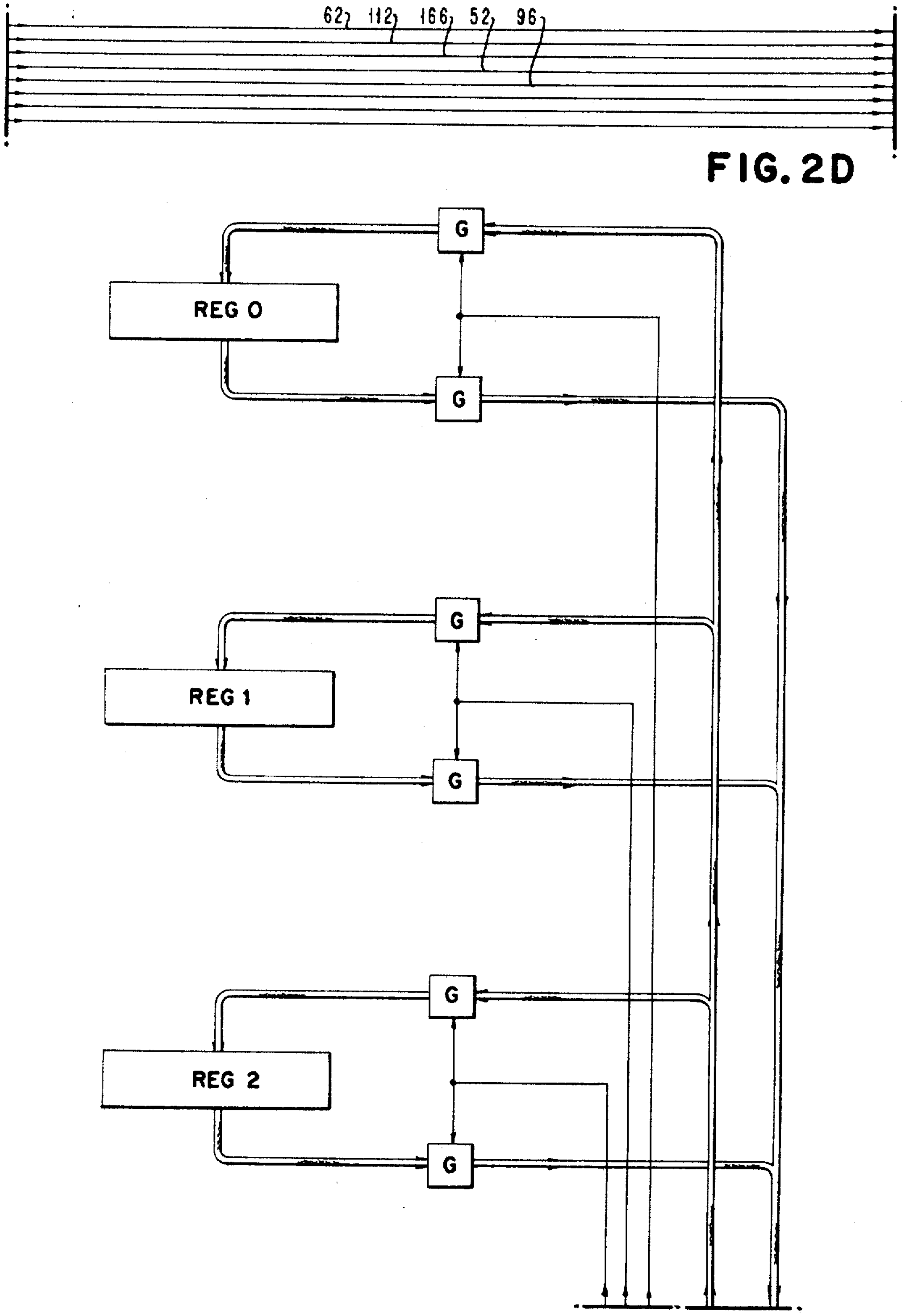
Figure 2E:
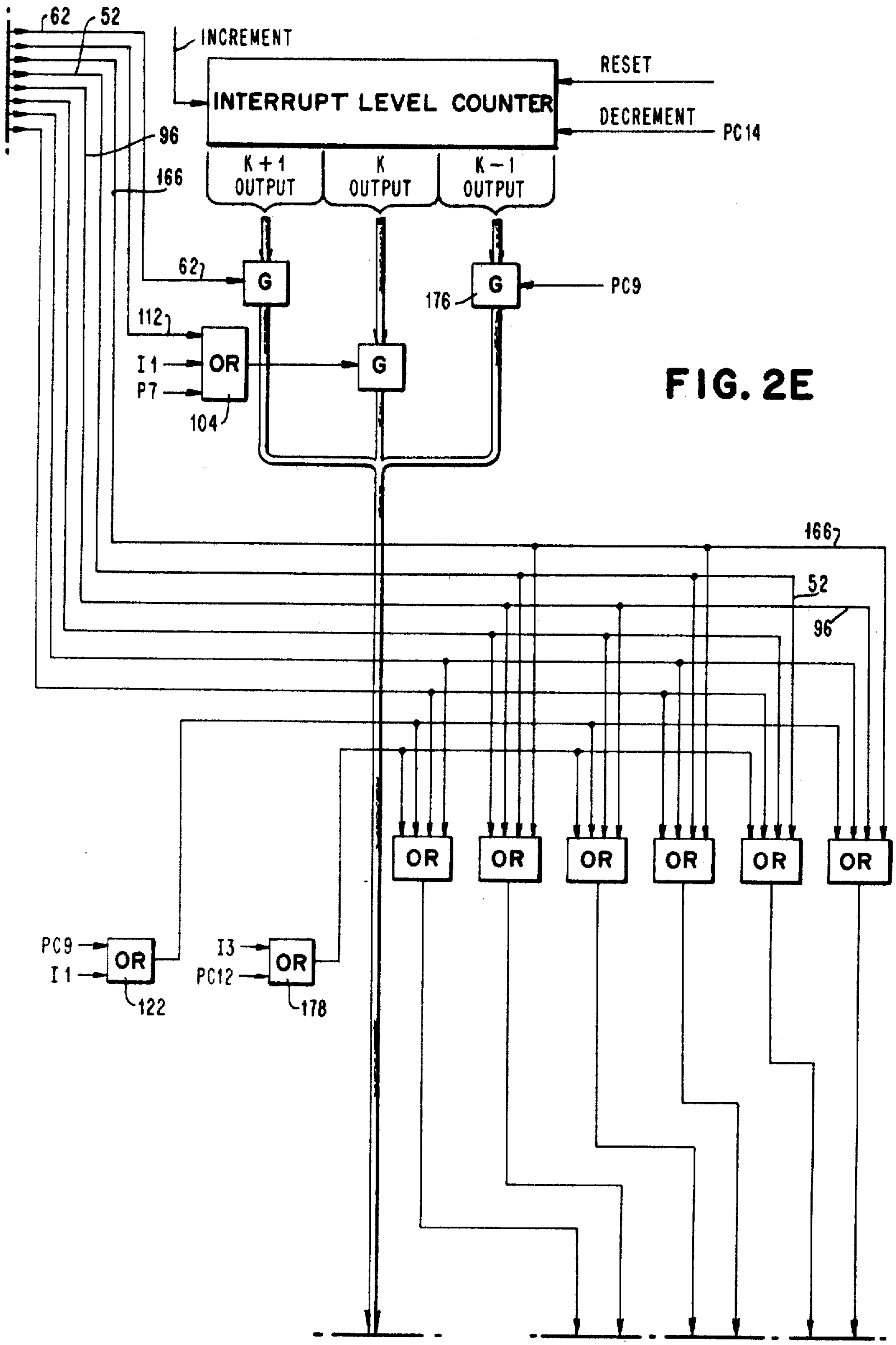

The pulse on line 34, i.e., pulse P1, the output of clock stage P1, is applied to line 36 (FIG. 1A). If at the time of such application, a flip-flop 38 is in its "zero" or reset state, an AND circuit 40 is enabled to gate the pulse on line 36 therethrough. Then, if a flip-flop 24 is in its set or "one" state, the pulse is further gated through an AND circuit 42 to activate a line U1. The output on line U1 is applied to an AND circuit 46 (FIG. 2B). As seen in the latter figure, if the U, T and L bits for register 1 are in the combinations of "101," "110" or "111" respectively, AND circuit 46 is enabled whereby the U1 pulse passes through an OR circuit 50 and appears on line 52 (FIGS. 2C–2E). Such activation of line 52 is effective to set the three right-most bits of the memory address register legended MAR (FIG. 2J) to the "001" state, the code chosen for register 1. The pulse on line 48 (FIG. 2B) is also applied through a line 54, an OR circuit 56, a line 58, and an OR circuit 60 to a line 62 (FIG. 2C) where it is effective to gate the $K+1$ output of a counter legended "Interrupt Level Counter" (FIG. 2E) to the three leftmost bits of register MAR (FIG. 2J). It is to be noted that the interrupt level counter has three outputs. The "K" output thereof is the actual number which exists in the counter. The "$K+1$" output includes logic which increments the contents of the counter by 1 and the "$K-1$" output contains logic which decrements its contents by 1.

When register MAR is loaded, pulse P1 ends, and the U1D pulse (FIG. 1A) appears as an output from a delay stage 64. The latter pulse is employed to reset a flip-flop 44 (FIG. 2A) to the "zero" state. Simultaneously with the appearance of the U1D pulse, a pulse appears on line 17 from a delay unit 66 (FIG. 2C). The output pulse from stage 66 turns on monostable multivibrator P3 (FIG. 3) and the resulting output pulse P3 thereof is applied to an OR circuit 68 (FIG. 2J) to produce a "Read Access" output to the memory. When monostable multivibrator P3 reverts to its stable state whereby pulse P3 terminates, monostable multivibrator P4 is turned on thereby, the pulse P4 being applied to an OR circuit 70 (FIG. 2J) to effect the gating of the contents of a memory data register legended MDR into register 1 (FIG. 2D).

The function of the decoder shown in FIG. 2J is to translate the three bit binary number contained in the right half of the MAR register into a "one out of N" code to enable gates for the appropriate register (FIG. 2D). Thus, a pulse applied to OR circuit 70 (FIG. 2J) enables the gate that applies the contents of the MDR register to all of the respective register gates. The proper register gate is selected by the decoder.

Referring to FIG. 2B, if AND circuit 46 is not enabled at the time that the U1 pulse occurs, then an AND circuit 72 is enabled and a pulse appears on line 74 instead of line 48. The pulse on line 74 is passed through an OR circuit 76 and is delayed by a delay circuit 78 (FIG. 2G). In this connection, it is to be realized that it is intended that the delayed pulse output of delay stage 78 appear on line 15 immediately following the termination of the U1D pulse (FIG. 1A), the U1D pulse being employed to reset flip-flop 24 to its "zero" state. With such arrangement, monostable multivibrator P1 (FIG. 3) is again turned on to locate the flip-flop in the chain of flip-flops following flip-flop 24 which might be in its "one" state.

Figure 1B:
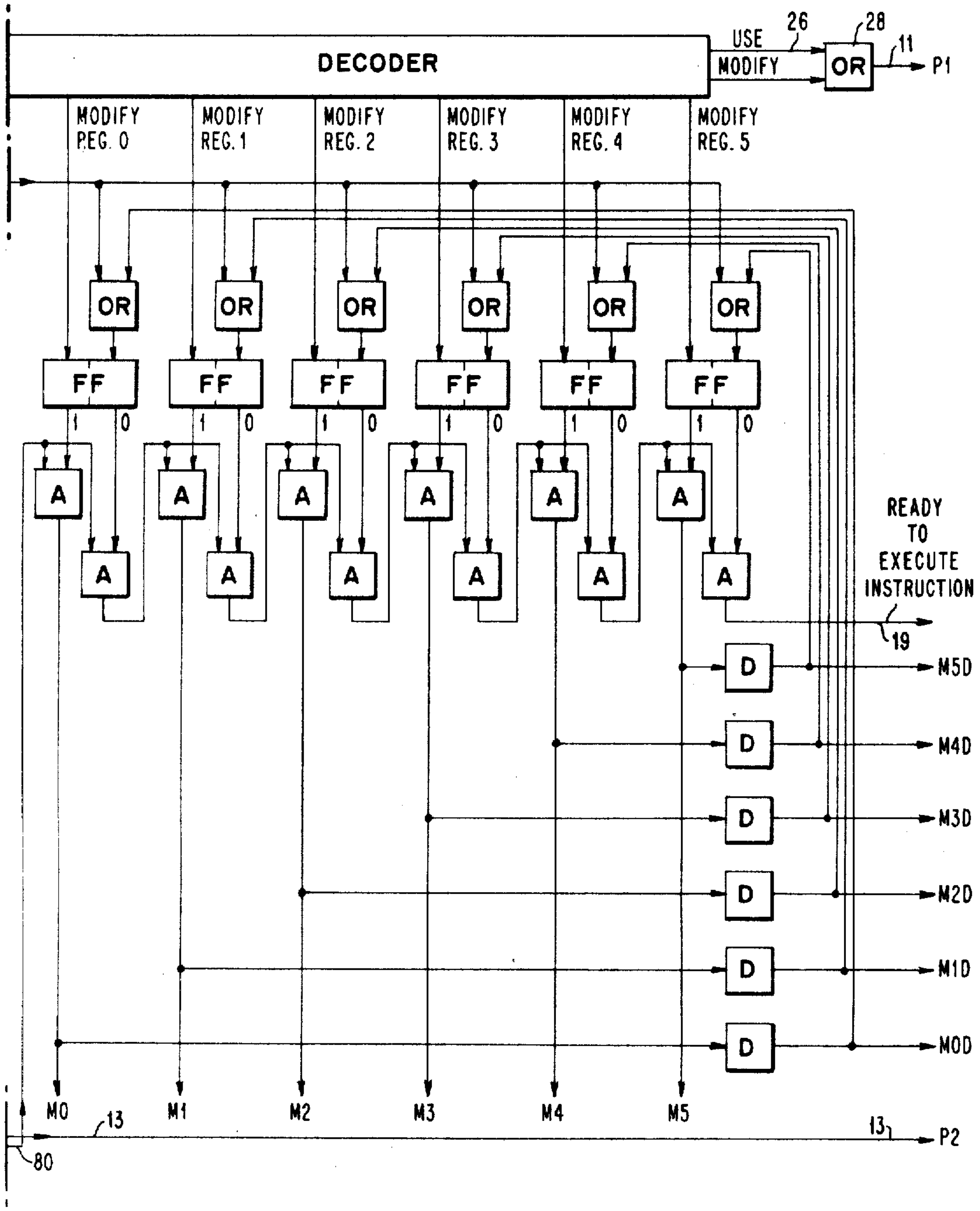

If no register is to be employed in the execution of a given instruction, then the P1 pulse appears on line 13 (FIG. 1B) to turn on monostable multivibrator P2. Pulse P2 is applied to line 80 (FIG. 1A) and if there is a register or there are registers whose contents are to be modified, the appropriate ones of lines M0 to M5 (FIG. 1B) become active. Thus, for example, let it be assumed that line M2 becomes active. Consequently, the pulse on line M2 is applied to AND circuits 82, 84, and 86 (FIG. 2B). If at this juncture the U, T, and L bits are in the state, "101," AND circuit 82 is enabled whereby a pulse appears on line 88. If the U, T, and L bits are in the state, "001," AND circuit 84 is enabled whereby a pulse appears on line 90. If the U, T, and L bits are not in either of the states 101 or 001, then AND circuit 86 is enabled and a pulse appears on line 92.

If there is considered first the condition wherein a pulse appears on line 88, i.e., where the state of the U, T, and L bits is "101," it is seen that such pulse passes through an OR circuit 94 (FIG. 2C), appears on a line 96, and is effective to set the rightmost three bits of register MAR to 010 (FIG. 2J), i.e., the code for register 2. A branch circuit extends by means of a line 98, an OR circuit 100 and an OR circuit 60 (FIG. 2C) to a line 62 and is effective to gate the $K+1$ output of the interrupt level counter (FIG. 2E) to the three leftmost bits of the MAR register (FIG. 2J). It is noted that an OR circuit 100 (FIG. 2C) is connected to a delay unit 102 which produces a delayed pulse on line 10. The latter delayed pulse on line 10 occurs at the same time as the occurrence of the M2D pulse (FIG. 1B), such time being chosen to be slightly after pulse P2 terminates. The pulse on line 10 is effective to turn on the monostable multivibrator P5 (FIG. 3) and its consequent pulse P5 output is applied to OR circuit 68 (FIG. 2J) to provide a read access output to the memory. When pulse P5 terminates, it turns on a monostable multivibrator P6 whose pulse output P6 is applied to OR circuit 70 (FIG. 2J) to gate the contents of the MDR register to register 2 (FIG. 2D). When pulse P6 terminates, it turns on multivibrator P7 whose pulse output P7 is applied to an OR circuit 104 (FIG. 2E) to gate the K output of the interrupt level counter to the three leftmost bits of register MAR (FIG. 2J).

When the P7 pulse terminates it turns on a monostable multivibrator P8 whose pulse P8 output is applied to an OR circuit 106 (FIG. 2J) to produce a write access output to the memory. When pulse P8 terminates, it again turns on monostable multivibrator P2.

The memory shown in FIG. 2J which may be of the conventional core memory type, is suitably provided with its own clock (not shown) and goes through its own cycle. The first portion of a memory cycle may be conveniently referred to as the "Read" portion and the second portion thereof may be referred to as the "Write" portion. The address of a memory word is determined by the contents of register MAR.

When a "read access" input to the memory occurs, the circuits in the memory are conditioned such that during the "Read" portion of the memory cycle, the appropriate selected word is read into he MDR register. After the word is read, the corresponding word bits in the memory are all set to zeros. With such arrangement, it is realized that in the second half or "Write" portion of the memory cycle, the word has to be read back from the MDR register to the memory, the word being available at this time in the MDR register.

Upon the occurrence of a "Write" access input to the memory, the word is not read into the MDR register during "Read" portion of the memory cycle, i.e., it merely being set to all zeroes in the memory. In the "Write" portion of the memory cycle, the contents of the MDR register are written into the memory.

Let it be assumed that the M2 pulse (FIG. 2B) had appeared on line 90 instead of line 88. In such situation, the three rightmost bits of the MAR register would be in the 010 state. A branch circuit is provided from line 90 through a line 108 to an OR circuit 110, a line 112 and OR circuit 104 (FIGS. 2B–2E), such branch circuit being effective to gate the K output of the interrupt level counter to the leftmost three bits of register MAR. Line 112 is connected to a delay stage 114 (FIG. 2C) (which provides the same delay as that provided by delay stage 102), delay stage 114 producing a delayed pulse on line 12 which turns on a monostable multivibrator P9 whose pulse P9 output gates the contents of register 2 to the MDR register. When pulse P9 terminates, it turns on a monostable multivibrator P10 whose pulse P10 output is applied to OR circuit 106 (FIG. 2J) to provide a write access output. When pulse P10 terminates it turns on multivibrator P2.

If neither of AND circuits 82 or 84 is enabled, AND circuit 86 is enabled the M2 pulse appears on a line 92 which leads to an OR circuit 116. A delay stage 118 produces a pulse just a short time after the M2D pulse terminates to turn on multivibrator P2.

If, when pulse P2 is applied, there is no register whose contents are to be modified, the pulse P2 appears on line 19 (FIG. 1B) and this pulse can be employed to indicate to the processor that an instruction is ready to be executed. The M2D pulse, through OR circuits 45 and 47 resets a flip-flop 49 to the "zero" state and sets a flip-flop 51 to the "one" state.

The foregoing completes the description of the operation of the P (process) clock and the operations that it controls.

There immediately follows hereineblow a description of the events that ensue when an interrupt signal occurs, such events being controlled by a clock suitably designated as the I (interrupt) clock.

When an interrupt signal occurs, operation of the I clock is initiated, there being, of course, sufficient time to cycle the I clock prior to the decoding of a next occurring instruction.

Figure 4:
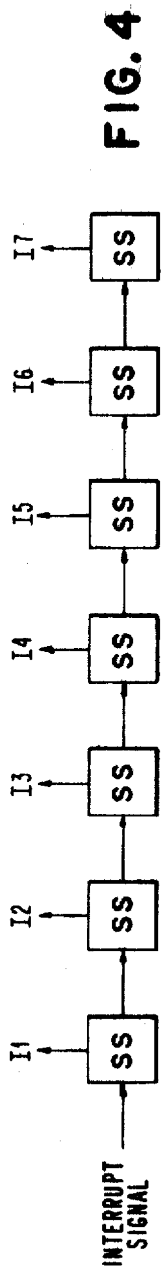
FIG. 4 is a block diagram of an embodiment suitable for use as an interrupt clock.

In considering the operation of the I clock shown in FIG. 4, it is to be realized that structurally it may suitably comprise a chain of monostable multivibrators similar to that of the P clock and in which a succeeding, i.e., next higher numbered, multivibrator is turned on by the trailing edge of the astable state pulse of an immediately preceding multivibrator.

Figure 2F:
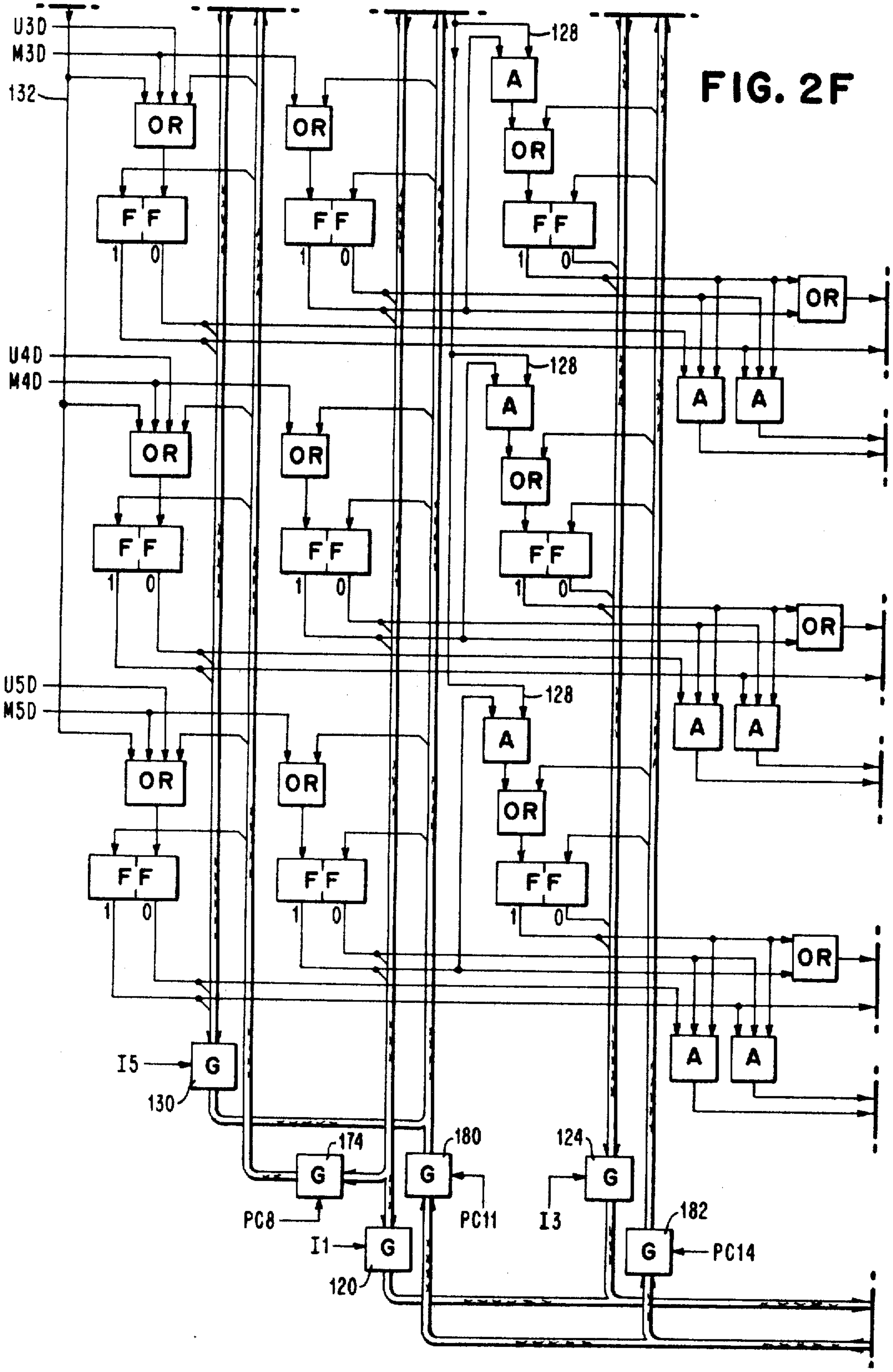
Figure 2G:
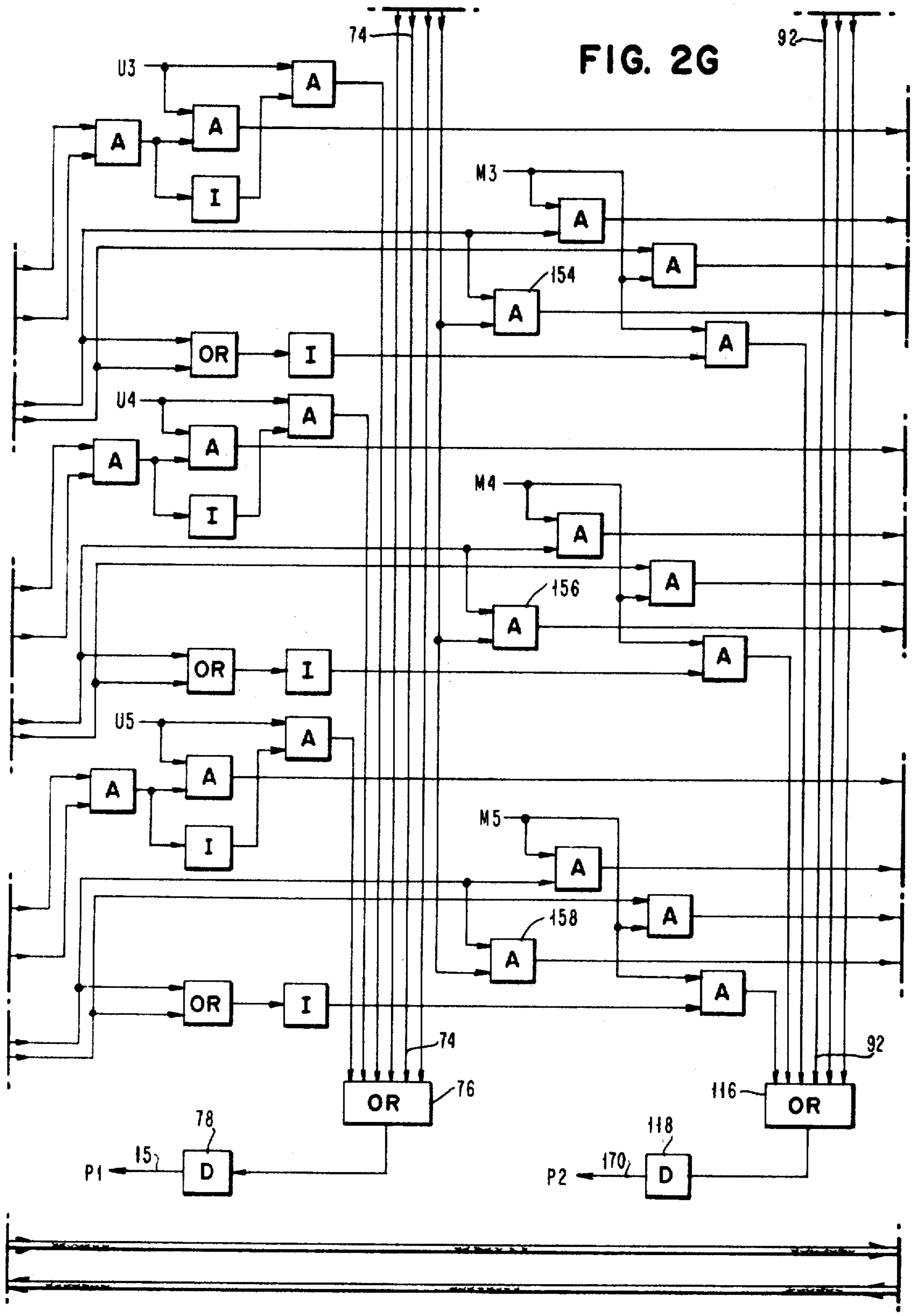
Figure 2H:
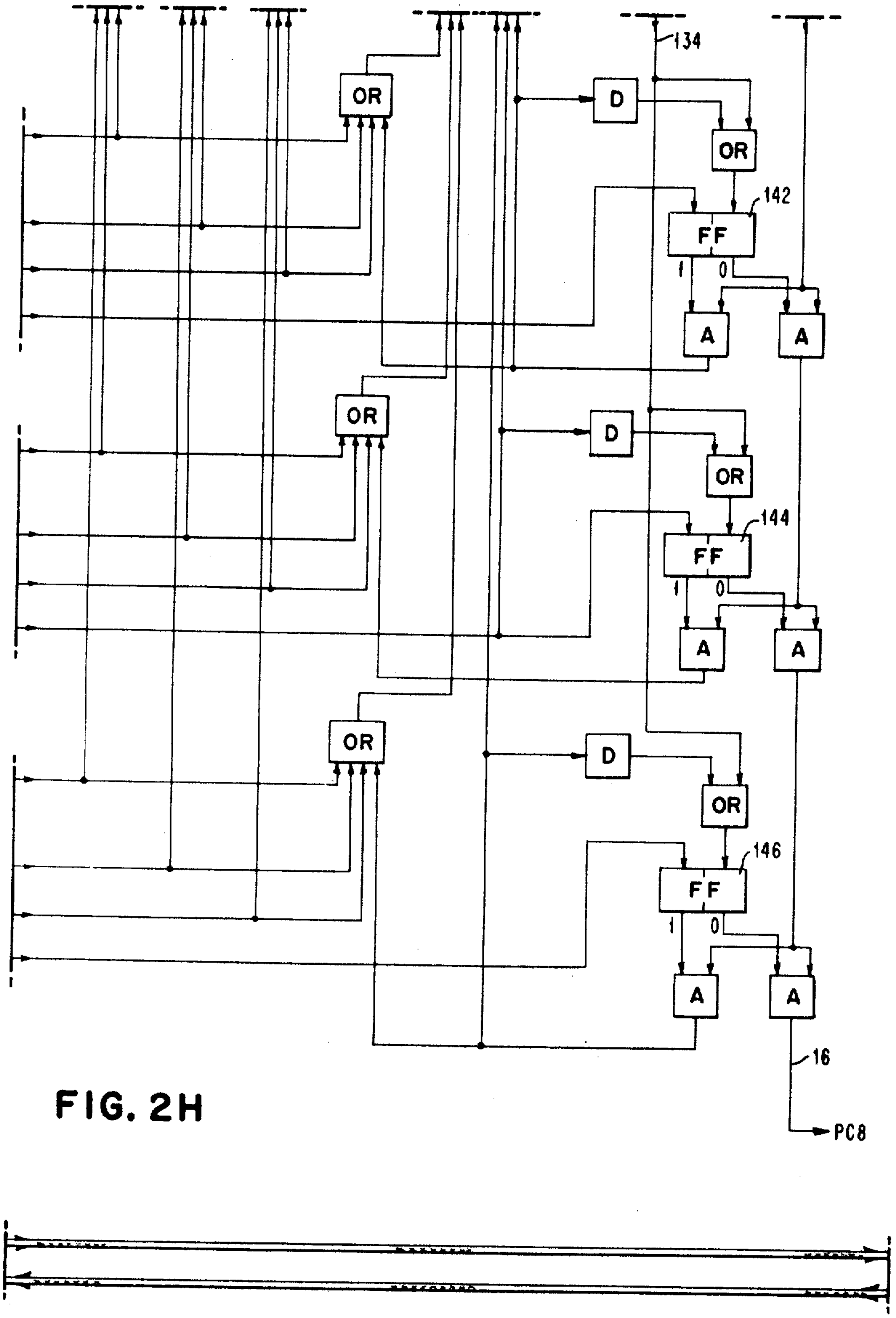
Figure 2I:
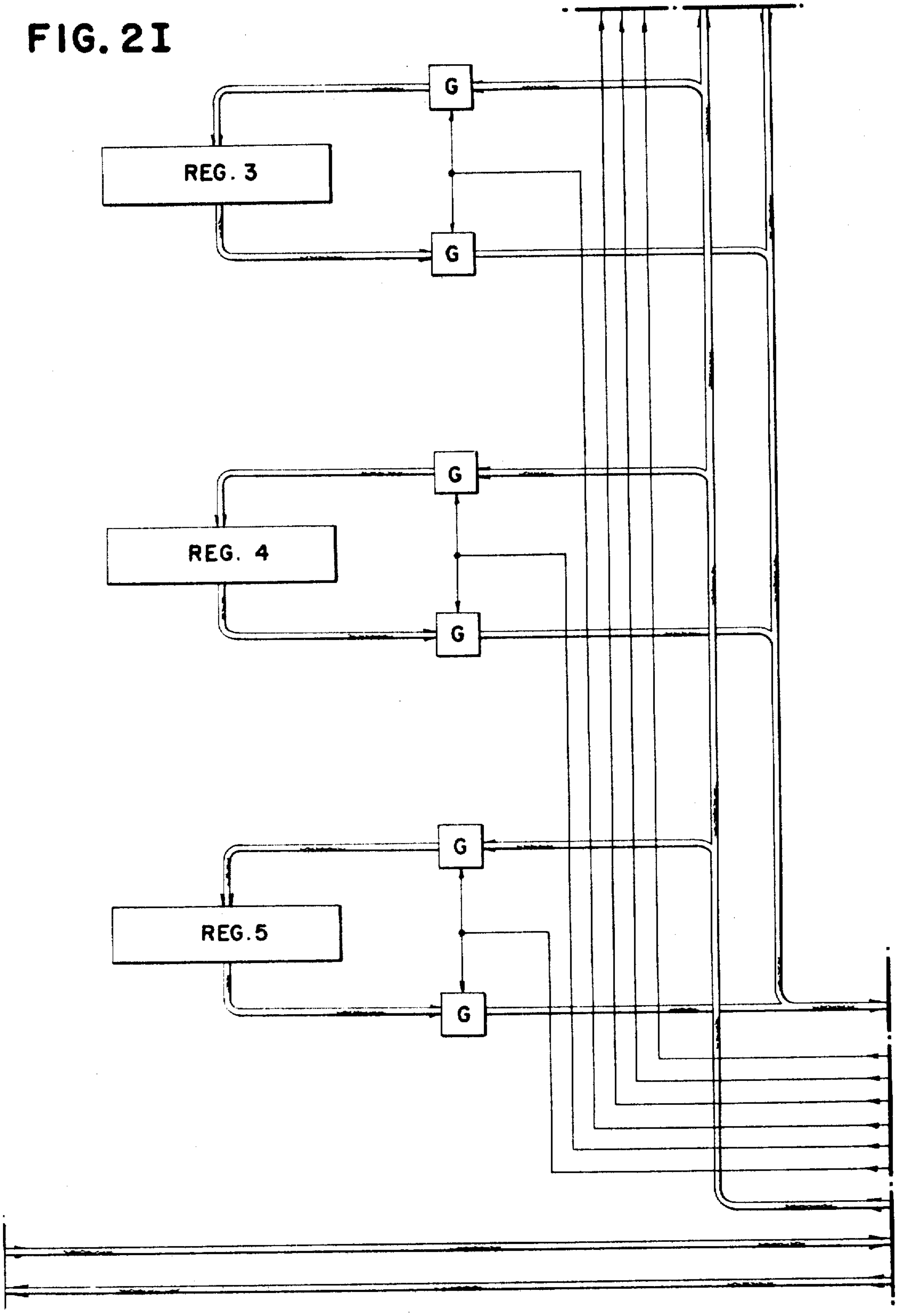
Figure 2J:
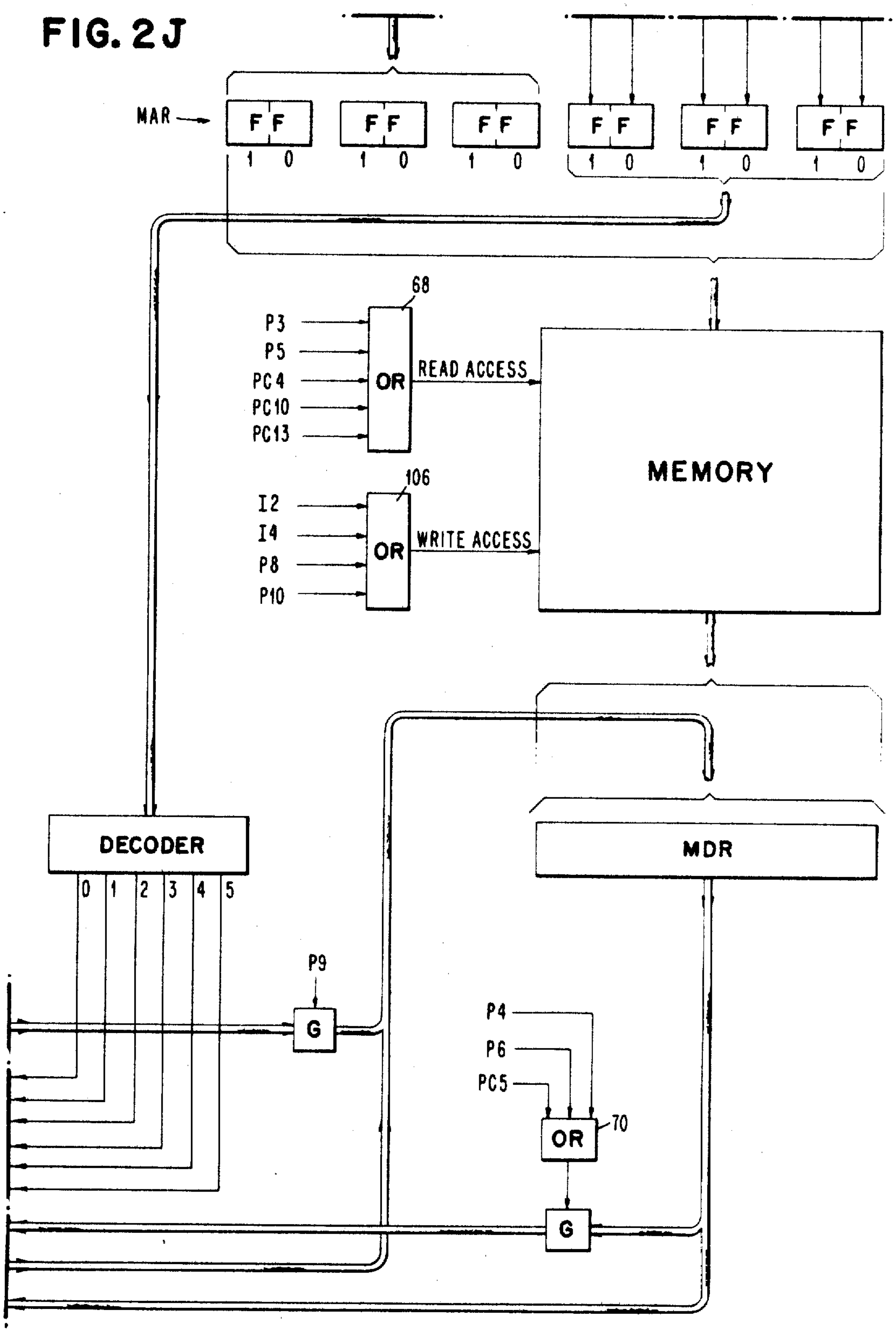

Referring to FIG. 2F, it is seen therein that pulse I1 is applied to a gate 120 to gate the "T" vector to the MDR register (FIG. 2J), the T vector being a set of T flip-flops which effectively function as a register. Pulse I1 is also applied to OR circuit 104 (FIG. 2E) to gate the K output of the interrupt level counter to the leftmost three bits of the MAR register. The I1 pulse is also applied to an OR circuit 122 (FIG. 2E) in order to set the rightmost three bits of the MAR register to the state 110, the code for the T register. When the pulse I1 terminates, it turns on a monostable multivibrator I2 (FIG. 4).

Pulse I2 is applied to OR circuit 106 (FIG. 2J) to provide a write access output. When pulse I2 terminates, it turns on monostable multivibrator I3 (FIG. 4).

Pulse I3 is applied to a gate 124 (FIG. 2F) to gate the L vector, the contents of the register comprising the L latches, to the MDR register. Pulse I3 is also applied to an OR circuit 178 (FIG. 2E) to set the right half of register MDR to the 111 state, the code for the L vector. When pulse 13 terminates, it turns on a multivibrator I4 (FIG. 4).

Pulse I4 is applied to OR circuit 106 (FIG. 2J) in order to provide a write access output. It is also applied to a line 128 (FIG. 2A) which gates any "ones" in the T vector to the L vector. When pulse I4 terminates, it turns on a multivibrator I5.

Pulse I5 is applied to a gate 130 (FIG. 2F) in order to gate the U vector to the T vector. When pulse I5 terminates, it turns on a multivibrator I6. Pulse I6 is applied to a line 132 (FIG. 2A) in order to reset all of the latches of the U register to "zeros." When pulse I6 terminates, it turns on a multivibrator I7, pulse I7 being employed to increment the interrupt level counter.

Figure 5:
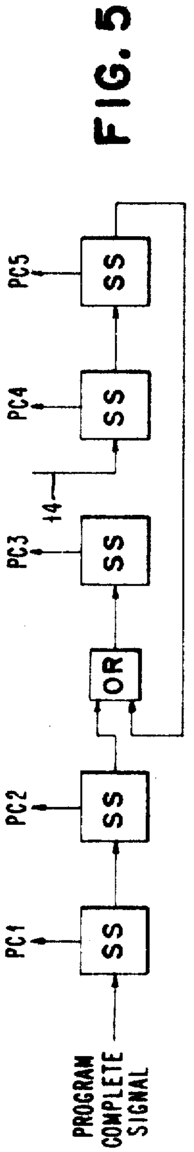
FIG. 5 is a block diagram of a first portion of an embodiment suitable for use as a program complete clock.
Figure 6:
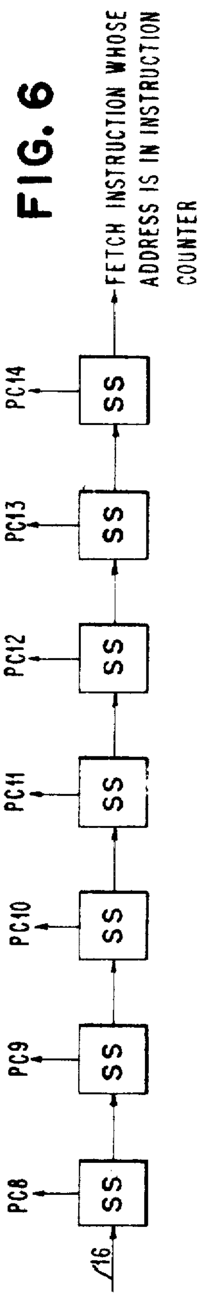
FIG. 6 is a block diagram of a second portion of the program complete clock, the first portion of which is depicted in FIG. 5.

When an interrupt program is completed, a "Program Complete" signal issues to start the PC clock (FIGS. 5 and 6). The "Program Complete" signal is suitably produced from an instruction decoder stage (not shown). The PC clock, similar to the P and I clocks suitably comprises a series arrangement of monostable multivibrators in which the trailing edge of the astable output pulse of a multivibrator turns on the next succeeding multivibrator in the arrangement.

Thus, the astable pulse output of a monostable multivibrator PC1 is applied to a line 134 (FIG. 2C) to reset the flip-flops 136, 138, 140, 142, 144, and 146 to "zero" states. When pulse PC1 terminates, it turns on a multivibrator PC2. Pulse PC2 is applied to gates 148, 150, 152, 154, 156, and 158 (FIGS. 2B and 2G). The enabling of any of the aforementioned gates is effective to set a corresponding flip-flop of the aforementioned flip-flops (FIGS. 2C and 2H) to the "one" state, such setting signifying that the corresponding register has to be restored from the $K+1$ area. When pulse PC2 terminates, a multivibrator PC3 is turned on.

The function of pulse PC3 is to locate the registers whose contents have to be restored from the $K+1$ area. Thus, for example, let it be assumed that flip-flop 136 is in the "one" state. In such situation, pulse PC3 is gated through an AND circuit 160 (FIG. 2C) and appears on a line 162 which goes to an OR circuit 164. An output of OR circuit 164 appears on a line 166 and operates to place a 000 setting in the rightmost three bits of register MAR (FIG. 2J). A branch circuit which includes a line 163, an OR circuit 165, a line 167, OR circuit 60 and line 62 operates to gate the $K+1$ output of the interrupt level counter to the three leftmost bits of the MAR register. When pulse PC3 terminates, a monostable multivibrator PC4 is turned on by a delay unit 168 (FIG. 2C). Flip-flop 136 is turned off by the output of a delay unit 172 (FIG. 2C), such output occurring at the same time as the output from delay unit 168.

Pulse PC4 is applied to OR circuit 68 (FIG. 2J) to provide a read access output. When pulse PC4 terminates, it turns on a monostable multivibrator PC5, the pulse PC5 output of the latter multivibrator being applied to OR circuit 70 (FIG. 2J) to gate the contents of the MDR register to register 0. When pulse PC5 ends, it turns on multivibrator PC3. If none of flip-flops 136 to 146 (FIGS. 2C and 2H) are in their "one" states, pulse PC3 (FIG. 2H) appears on line 16 and turns on a monostable multivibrator PC8.

Pulse PC8 is applied to a gate 174 (FIG. 2F) to gate the T vector to the U vector. When pulse PC8 terminates, it turns on a multivibrator PC9, the pulse PC9 output therefrom being applied to a gate 176 (FIG. 2E) to gate the ($K$—1) output of the interrupt level counter to the three leftmost bits of the MAR register. It is also applied to an OR circuit 122 (FIG. 2E) to set the right half of register MAR to the 110 state. When pulse PC9 terminates, it turns on a monostable multivibrator PC10 whose pulse PC10 output is applied to OR circuit 68 (FIG. 2J) to provide a read access output for the memory. When pulse PC10 terminates, it turns on a multivibrator PC11.

Pulse PC11 is applied to a gate 180 (FIG. 2F) to gate the contents of the MDR register to the T vector. When pulse PC11 terminates, it turns on a multivibrator PC12 whose pulse PC12 output is applied to OR circuit 178 (FIG. 2E) to set the three rightmost bits of the MAR register to the 111 state. When pulse PC12 terminates, it turns on multivibrator PC13. Pulse PC13 is applied to OR circuit 68 (FIG. 2J) to provide a read access output for the memory. When pulse PC13 terminates, it turns on a multivibrator PC14 whose pulse PC14 output is applied to a gate 182 (FIG. 2F) to gate the contents of the MDR register to the L vector. The PC14 pulse is also employed to decrement the interrupt level counter. When pulse PC14 terminates, it produces a pulse which is used to fetch the instruction whose address is in the instruction counter.

While the foregoing description has been that of an embodiment of an "interrupt system" according to the invention, it is readily appreciated, that such embodiment could be advantageously employed in the execution of a subroutine. In such situation, instead of an interrupt signal in the program, there could be an instruction for branching to a subroutine. In this subroutine, the last instruction would be one such as a return from the subroutine. The effect of such return instruction would be the same as the program complete signal described in the foregoing embodiment.

Furthermore, it is to be understood that while the hereinabove described embodiment shows how the contents of the T and L registers are stored, other registers which indicate the current status of the processor may also be stored. An example of such other register is the instruction counter.

Figure 7:
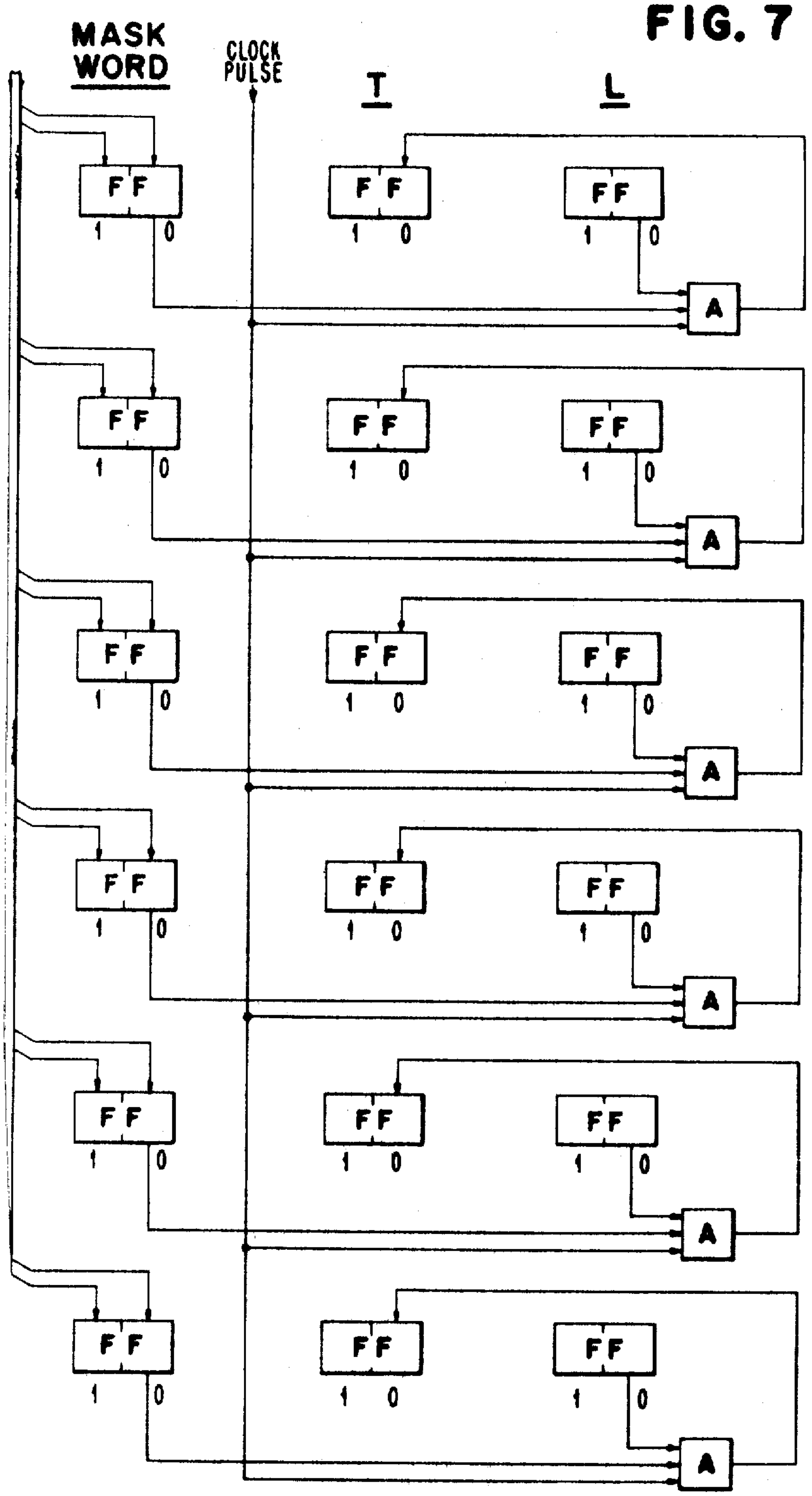
FIG. 7 is a block diagram of an embodiment of a system for enabling the execution of a special instruction for the purpose of resetting chosen latches in the T register.

In addition, according to the invention, an instruction such as "Reset T Latch" could be inserted between interrupts. Such instruction would specify an address in memory which contains a mask word. The bits of the mask word could then be placed into an AND arrangement with the bits of the L register. Then, for each bit position in which the mask bit is zero, and the L bit is zero, the T bit would be set to zero. Such arrangement is depicted in FIG. 7.

Figure 8:
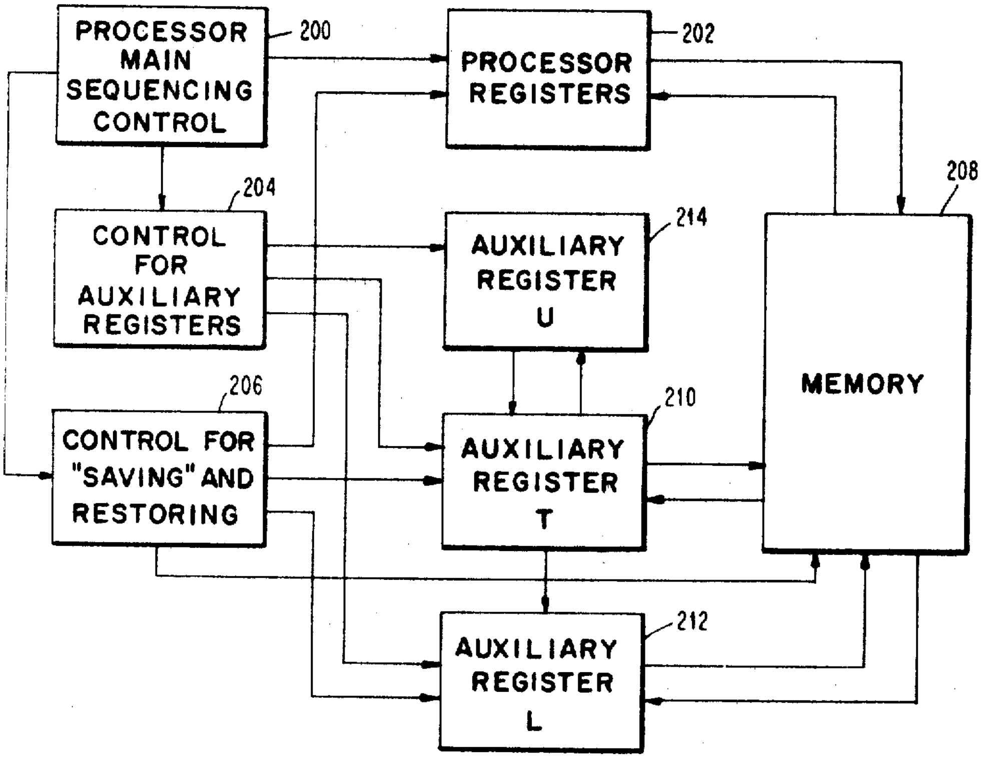
FIG. 8 is a block diagram of a total system constructed according to the invention for enabling operation at a plurality of levels of interrupt conditions.

To summarize the foregoing, considering the general case according to the invention, i.e., where there are N levels of interrupt capable of being handled, reference is made to FIG. 8 which shows a block diagram that depicts the general structure of the invention.

In FIG. 8, a stage 200 legended "processor main sequencing control" represents the instruction decoder and other ancillary structures in the central processor which control the interrupt executions. It is seen that stage 200 both controls the processor registers 202, a stage 204 legended "control for auxiliary registers," and a stage 206 legended "control for saving and restoring," the latter stage being concerned with the control of the transfer into and out of the memory 208 of the contents of the processor registers R, and the contents of the auxiliary registers T and L, the latter being represented by stages 210 and 212. It is also noted in the arrangement shown in FIG. 8 that auxiliary register T, i.e., stage 210, communicates with auxiliary register L, i.e., stage 212, when an interrupt level is initiated and stage 210 communicates with auxiliary register U, i.e., stage 214, when an interrupt level terminates. Auxiliary register U214 communicates with auxiliary register T210 when an interrupt occurs. As is seen in FIG. 8, processor registers 202 and auxiliary registers T and L, i.e., stages 210 and 212, communicate with memory 208, the control being exercised by stage 206.

Figure 9:
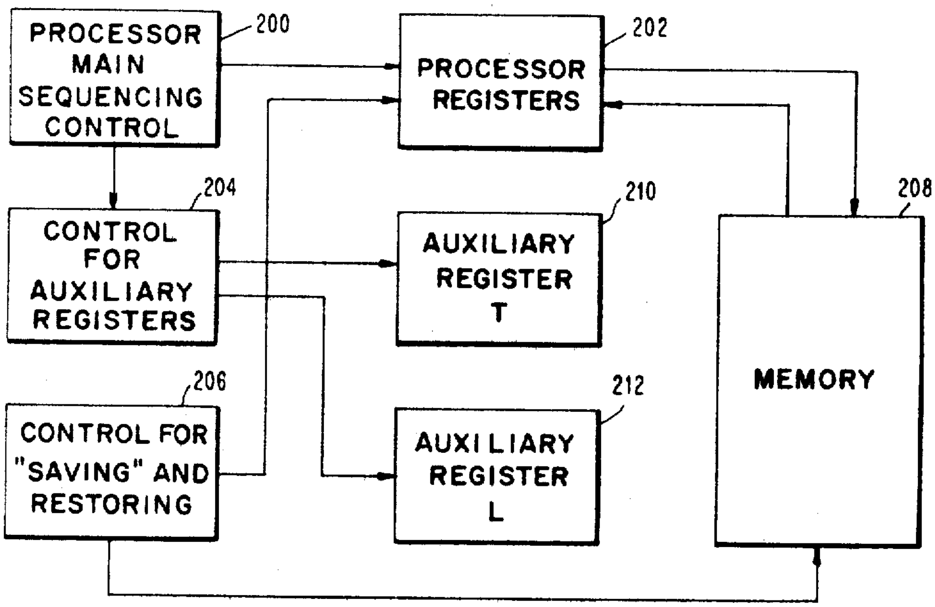
FIG. 9 is a block diagram similar to that of FIG. 8 of a system constructed according to the invention for enabling operation at a single level of interrupt.

FIG. 9 is a block diagram of the arrangement as described hereinabove which permits the processing for but one level of interrupt. As has been shown, in this operation, no U register is necessary and only one "save" area is required in memory 208.

To review the operation of the FIG. 9 arrangement, initially when the main program is initiated, both auxiliary register T, i.e., stage 210, and auxiliary register L, i.e., stage 212, are reset. Thereafter, whenever the contents of a processor register $R_i$ contained in processor registers stage 202 are modified, its corresponding latch in register L stage 212 is set. When the interrupt arrives, each modification of a register $R_i$ for which its corresponding latches $T_i$ and $L_i$ are in the 0, 1 combinational state causes the contents of the latter register to be "saved" in memory 208 prior to such modification and the appropriate latch $T_i$ is also set. When the branch or interrupt condition terminates and control returns to the main program, the contents of the processor register $R_i$ whose contents had been "saved" are restored from the single save area whenever an instruction attempts to use the contents of a register for which its corresponding auxiliary register latches $T_i$ and $L_i$ are in the 1, 1 combinational state. Latch $T_i$ is always reset when the contents of its corresponding register $R_i$ are used or modified.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A control system for storing in a processor's memory only the contents of those processor registers which are used in a program execution and in a plurality of interrupts of different levels comprising:
- respective progressively ranked areas in said memory reserved for each of said levels and for storing the contents of those processor registers which are modified during said levels prior to their modification, the operation of said processor in said program execution being the lowest ranked of said levels;
- first means whose contents identify those of said processor register whose contents are modified during a given level of interruption;
- second means whose contents identify all of those of said processor registers whose contents had been modified up to the occurrence of said given level of interruption;
- means responsive to the occurrence of said given level of interruption for storing the contents of said first and second means in the area reserved for the level next lower than said given level and for logically combining and transferring the contents of said first means to said second means, whereby said first means is conditioned to thereafter identify those processor registers whose contents are modified during said given level of interruption;
- means operative upon the attempted modification of the contents of a register during said given level of interruption for effecting the indication of the occurrence of said modification in said first means and for storing the contents of said last-named register in the area reserved for said given level of interruption;
- third means whose contents identify those of said processor registers whose contents had been modified during said given level of interruption upon the termination of said last-named interruption;
- means for resetting said first means from said third means upon the occurrence of said given level of interruption; and
- means responsive to the termination of said given level of interruption for transferring the contents of said first means to said third means and for replacing the respective contents of said first and second means and chosen ones of said processor registers with their contents which had been stored in said memory area for said level next lower than said given level of interruption upon the occurrence of said given level interruption.

2. A control system for storing in a processor's memory only the contents of those processor registers which are used in a program execution and in a plurality of interrupts of different levels comprising:
- respective progressively ranked areas in said memory reserved for each of said levels and for storing the contents of those processor registers whose contents are modified during said levels prior to their modification, the operation of said processor in said program execution being the lowest ranked of said levels;
- first latches for each of said respective processor registers for identifying which of said processor registers' contents are modified during a given level of interruption, said first latches collectively effectively constituting a first control register;
- second latches for each of said respective processor registers for identifying which of said processor registers' contents had been modified up to the occurrence of said given level of interruption, said second latches collectively effectively constituting a second control register;
- means responsive to the occurrence of said given level of interruption for storing the contents of said first and second control registers in the area reserved for the interruption level next lower than said given level and for logically combining and transferring the contents of said first control register to said second control register, whereby said first control register is conditioned to thereafter identify those processor registers whose contents are modified during said given level of interruption;
- means operative upon the attempted modification of the contents of a processor register during said given level of interruption for indicating the occurrence of said attempted modification in said first control register and for storing the unmodified contents of said processor register in the area reserved for said given level of interruption prior to said modification;
- third latches for each of said respective processor registers for identifying those of said processor registers whose contents had been modified during said given level of interruption upon the termination of said last-named interruption, said third latches collectively effectively constituting a third control register;
- means for resetting said first register from said third register in response to the occurrence of said given level of interruption; and
- means responsive to the termination of said given level of interruption for transferring the contents of said first control register to said third control register.

3. A control system for storing in a processor's memory only the contents of those processor registers which are used in a program and in an interrupt comprising:
- an area reserved in memory for said interrupt;
- first means whose contents identify those of said processor registers whose contents are modified during said interrupt;
- second means whose contents identify those of said processor registers whose contents had been modified in said program up to the occurrence of said interrupt;
- means responsive to the occurrence of said interrupt for causing the contents of those processor's registers which had been modified in said program and are modified during said interrupt to be stored in said reserved area prior to said last-named modification and to effect respective indications of said last-named modifications in said first means; and means responsive to the termination of said interrupt for restoring the contents of chosen registers from said reserved area to said processor registers modified during said interrupt and for clearing said second means.

4. A control system for storing in a processor's memory only the contents of those processor registers which are used in a program and in an interrupt comprising:

an area reserved in said memory for said interrupt;

first latches for each of said respective processor registers for identifying which of said processor registers' contents had been modified in said program up to the occurrence of said interrupt, said first latches collectively effectively constituting a first control register;

second latches for each of said respective processor registers for identifying which of said processor registers' contents had been modified during said interrupt, said second latches collectively effectively constituting a second control register;

means responsive to the occurrence of said interrupt for effecting the storing of the contents of those processor registers which had been modified during said program and which are modified during said interrupt in said reserved area prior to their interrupt modification and to set the latches in said second contol register respectively corresponding to said interrupt modified processor registers; and means responsive to the termination of said interrupt for restoring the contents from said reserved area to said processor registers modified during said interrupt and for clearing said second control register.

5. A control system as defined in claim 2 wherein there is stored in said memory a word comprising bits respectively corresponding to each of said processor registers, each of said bits having a chosen binary state and wherein there are further included means responsive to the addressing of said word by a given programmed instruction for resetting first latches which correspond to those processor registers whose corresponding word bit is in a predetermined one of said chosen binary states.

6. A control system as defined in claim 2 wherein there is stored in said memory a word comprising bits respectively corresponding to each of said processor registers, each of said bits having a chosen binary state and wherein there are further included means responsive to a given programmed instruction for resetting those first latches which correspond to those processor registers whose corresponding word bit is in the zero binary state and whose respective corresponding second latches are in the reset state.

7. A control system for storing in a processor's memory only the contents of those processor registers which are used in a program execution and in a plurality of interrupts of different levels comprising:

respective progressively ranked areas in said memory reserved for each of said levels and for storing the contents of those registers whose contents are modified during said levels prior to their modification, the operation of said processor in said program execution being the lowest ranked of said levels;

first latches for each of said respective processor registers for identifying which of said processor registers' contents are modified during a given level of interruption, said first latches collectively effectively constituting a first control register;

second latches for each of said respective processor registers for identifying which of said processor registers had been modified up to the occurrence of said given level of interruption, said second latches collectively effectively constituting a second control register;

means responsive to the occurrence of said given level of interruption for storing the contents of said first and second control registers in the area in memory reserved for the level of interruption next lower than said given level;

means operative upon the occurrence of said given level of interruption for combining and transferring the contents of said first control register to said second control register;

means operative upon the attempted modification of the contents of a processor register during said given level of interruption for indicating the occurrence of said attempted modification in said first control register and for storing the unmodified contents of said processor register in the area reserved for said given level of interruption prior to said modification;

third latches for each of said respective processor registers for identifying those of said processor registers whose contents had been modified during said given level of interruption upon the termination of said last-named interruption, said third latches effectively constituting a third control register;

means operative upon the occurrence of said given level of interruption for resetting said first control register from said third control register;

means responsive to the termination of said given level of interruption for transferring the contents of said first control register to said third control register;

means operative upon the occurrence of the termination of said given level of interruption for replacing the respective contents of said first and second control registers and said processor registers with their contents which had been stored in said memory area for said level next lower than said given level of interruption upon the occurrence of said last-named interruption; and means for initially resetting said third control register upon the occurrence of an interrupt.

References Cited

UNITED STATES PATENTS

| | | | |
|---|---|---|---|
| 3,226,694 | 12/1965 | Wise | 340—172.5 |
| 3,293,610 | 12/1966 | Epperson et al. | 340—172.5 |
| 3,309,672 | 3/1967 | Brun et al. | 340—172.5 |
| 3,386,083 | 5/1968 | Geller et al. | 340—172.5 |

ROBERT C. BAILEY, *Primary Examiner.*

RAULFE B. ZACHE, *Assistant Examiner.*